US008472941B1

(12) United States Patent
Hong et al.

(10) Patent No.: US 8,472,941 B1
(45) Date of Patent: Jun. 25, 2013

(54) POLLING METHODS FOR USE IN A WIRELESS COMMUNICATION SYSTEM

(75) Inventors: Liang A Hong, Redmond, WA (US); Kamyar Moinzadeh, Renton, WA (US); Luong P. Nguyen, Everett, WA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 165 days.

(21) Appl. No.: 12/697,089

(22) Filed: Jan. 29, 2010

Related U.S. Application Data

(63) Continuation of application No. 09/597,016, filed on Jun. 20, 2000, now Pat. No. 7,720,468.

(60) Provisional application No. 60/140,959, filed on Jun. 23, 1999.

(51) Int. Cl.
*H04W 24/00* (2009.01)
(52) U.S. Cl.
USPC .......... 455/423; 455/574; 455/67.14; 455/88; 370/449; 370/328; 370/338
(58) Field of Classification Search
USPC ................ 455/423, 574, 67.14, 88; 370/449, 370/328, 338
See application file for complete search history.

(56) References Cited

U.S. PATENT DOCUMENTS

| 3,688,274 A | 8/1972 | Cormier et al. |
| 4,266,271 A | 5/1981 | Chamoff et al. |
| 4,638,428 A | 1/1987 | Gemma |
| 4,882,746 A | 11/1989 | Shimada |
| 5,289,160 A | 2/1994 | Fiorletta |
| 5,315,636 A | 5/1994 | Patel |
| 5,361,399 A * | 11/1994 | Linquist et al. ............ 455/412.2 |
| 5,377,232 A * | 12/1994 | Davidov et al. ............... 375/354 |

(Continued)

FOREIGN PATENT DOCUMENTS

| JP | 53068103 A | 6/1978 |
| JP | 1030303796 A | 11/1998 |

OTHER PUBLICATIONS

Rappaport, Theodore S., Wireless Communications, 1996, pp. 7-8, Prentice-Hall, Inc., Upper Saddle River, NJ.

(Continued)

*Primary Examiner* — Nghi H Ly
(74) *Attorney, Agent, or Firm* — Davis Wright Tremaine LLP; Michael J. Donohue; Heather M. Colburn

(57) ABSTRACT

Polling methods for use in a communication system, such as a fixed wireless communication system, are described. The fixed wireless communication system includes at least one wireless base unit and a plurality of fixed-location wireless transceiver units, where each transceiver unit is, for example, located at a home residence and coupled to a personal computer (PC). In one particular polling method, a wireless transceiver unit detects a failure of a primary energy source, switches to a battery backup for power, and sends a message to the wireless base unit indicating such failure. The message initiates the wireless base unit to poll the wireless transceiver unit on a periodic basis for status information. During the failure, a data traffic channel established between the units is torn down to conserve power at the wireless transceiver unit. Once the primary energy source is restored, the data traffic channel is brought back up and the periodic polling is terminated. Similar methods are applied in connection with the detection of a communication failure over the data traffic channel.

25 Claims, 12 Drawing Sheets

U.S. PATENT DOCUMENTS

| | | | |
|---|---|---|---|
| 5,410,737 | A | 4/1995 | Jones |
| 5,483,676 | A | 1/1996 | Mahany et al. |
| 5,526,357 | A | 6/1996 | Jandrell |
| 5,570,389 | A | 10/1996 | Rossi |
| 5,588,005 | A * | 12/1996 | Ali et al. ............... 370/346 |
| 5,600,635 | A | 2/1997 | Hamaki et al. |
| 5,697,059 | A | 12/1997 | Carney et al. |
| 5,749,052 | A | 5/1998 | Hidem et al. |
| 5,809,311 | A | 9/1998 | Jones |
| 5,838,774 | A | 11/1998 | Weisser, Jr. |
| 5,844,473 | A | 12/1998 | Kaman |
| 5,907,491 | A | 5/1999 | Canada et al. |
| 5,937,358 | A | 8/1999 | Gehrig |
| 6,014,374 | A | 1/2000 | Paneth et al. |
| 6,040,786 | A | 3/2000 | Fujioka |
| 6,058,420 | A | 5/2000 | Davies |
| 6,108,785 | A | 8/2000 | Poisner |
| 6,275,497 | B1 | 8/2001 | Varma |
| 6,301,514 | B1 * | 10/2001 | Canada et al. ............ 700/108 |
| 6,324,515 | B1 * | 11/2001 | Rabipour et al. ............ 704/500 |
| 6,347,092 | B1 | 2/2002 | Serikawa et al. |
| 6,349,102 | B1 | 2/2002 | Shibasaki et al. |
| 6,480,505 | B1 | 11/2002 | Johansson et al. |
| 6,567,386 | B1 | 5/2003 | Sugaya et al. |
| 6,594,284 | B1 | 7/2003 | Page et al. |
| 6,885,862 | B1 | 4/2005 | Pearson |
| 6,952,420 | B1 | 10/2005 | Castellano |
| 7,085,553 | B1 | 8/2006 | Harrenstien et al. |

OTHER PUBLICATIONS

Bertsekas, Dimitri, et al., Data Networks, 1992, pp. 11-14, Prentice-Hall, Inc., Englewood Cliffs, NJ.

* cited by examiner

| Octet | 7 | 6 | 5 | 4 | 3 | 2 | 1 | 0 |
|---|---|---|---|---|---|---|---|---|
| 1 | RU Acc Id | | Base Access ID | | | | | |
| 2 | BSOC | | | Message ID | | | | |
| 3 | Reserved | | | RU ID (8-13) | | | | |
| 4 | RU ID (0-7) | | | | | | | |
| 5 | Payload | | | | | | | |
| 6 | Payload | | | | | | | |
| 7 | Payload | | | | | | | |
| 8 | Payload | | | | | | | |
| 9 | Payload | | | | | | | |

FIG. 13

| | 7 | 6 | 5 | 4 | 3 | 2 | 1 | 0 |
|---|---|---|---|---|---|---|---|---|
| Octet 1 | RU Acc ID | | Base Access ID | | | | | |
| Octet 2 | BSOC | | | Message ID | | | | |
| Octet 3 | Payload | | | | | | | |
| Octet 4 | Payload | | | | | | | |
| Octet 5 | Payload | | | | | | | |
| Octet 6 | Payload | | | | | | | |
| Octet 7 | Payload | | | | | | | |
| Octet 8 | Payload | | | | | | | |
| Octet 9 | Payload | | | | | | | |

FIG. 14

| | 7 | 6 | 5 | 4 | 3 | 2 | 1 | 0 |
|---|---|---|---|---|---|---|---|---|
| Octet 1 | Subband | | Sequence Number | | | | | M |
| Octet 2 | BSOC | | | Message ID | | | | |
| Octet 3 | HSN (24-31) | | | | | | | |
| Octet 4 | HSN (16-23) | | | | | | | |
| Octet 5 | HSN (8-15) | | | | | | | |
| Octet 6 | HSN (0-7) | | | | | | | |
| Octet 7 | Payload | | | | | | | |
| Octet 8 | Payload | | | | | | | |
| Octet 9 | Payload | | | | | | | |

FIG. 15

| Field | Description |
|---|---|
| RU Access ID | Identifier used by the RU to distinguish sessions |
| Base Access ID | Identifier used by the Base to distinguish sessions |
| BSOC | Base Station Offset Code |
| Message ID | The message identifier whose contents is in payload field |
| Subband | The subband where the RU is operating in |
| Seq Number | Identifier of a segmented message |
| M | More bit: 0/1 = None/More to follow |
| RU ID | Identify RU of interest |
| HSN | Hardware Serial Number |
| Payload | CAC message payload (up to 5 bytes for UCAC, 7 bytes for SCAC, and 3 bytes for Installation CAC) |

FIG. 16

|  | 7 | 6 | 5 | 4 | 3 | 2 | 1 | 0 |
|---|---|---|---|---|---|---|---|---|
| Octet 1 | RU Acc ID | | Base Access ID | | | | | |
| Octet 2 | BSOC | | | Message ID | | | | |
| Octet 3 | rsvd | DCP | RU ID (8-13) | | | | | |
| Octet 4 | RU ID (0-7) | | | | | | | |
| Octet 5 | Payload | | | | | | | |
| Octet 6 | Payload | | | | | | | |
| Octet 7 | Payload | | | | | | | |
| Octet 8 | Payload | | | | | | | |
| Octet 9 | Payload | | | | | | | |

FIG. 17

|  | 7 | 6 | 5 | 4 | 3 | 2 | 1 | 0 |
|---|---|---|---|---|---|---|---|---|
| Octet 1 | RU Acc ID | | Base Access ID | | | | | |
| Octet 2 | BSOC | | | Message ID | | | | |
| Octet 3 | HSN (24-31) | | | | | | | |
| Octet 4 | HSN (16-23) | | | | | | | |
| Octet 5 | HSN (8-15) | | | | | | | |
| Octet 6 | HSN (0-7) | | | | | | | |
| Octet 7 | Reserved | | | | | | | DCP |
| Octet 8 | Payload | | | | | | | |
| Octet 9 | Payload | | | | | | | |

FIG. 18

POLLING METHODS FOR USE IN A WIRELESS COMMUNICATION SYSTEM

RELATED APPLICATIONS

This application is continuation of U.S. patent application Ser. No. 09/597,016, filed Jun. 20, 2000 now U.S. Pat. No. 7,720,468, which claims the benefit of U.S. Provisional Application No. 60/140,959, filed Jun. 23, 1999, entitled "Method for Establishing a Communication Channel in a Personal Wireless Access Network," which is incorporated herein in its entirety.

The following applications, assigned to the Assignee of the current invention, and being filed concurrently, contain material related to the subject matter of this application, and are incorporated herein by reference:

D. Gibbons et al., entitled "Methods and Apparatus for Dynamically Assigning Time Slots in a Wireless Communication System," U.S. Ser. No. 09/597,044, filed Jun. 20, 2000, now U.S. Pat. No. 6,801,513; and D. Gibbons et al., entitled "Establishing a Communication Channel in a Wireless Network," U.S. Ser. No. 09/597,043, filed Jun. 20, 2000, now U.S. Pat. No. 6,801,775.

BACKGROUND OF THE INVENTION

1. Field of the Invention

The present invention relates generally to wireless communication systems, such as "fixed wireless systems," utilizing polling techniques.

2. Description of the Related Art

In a "fixed wireless system," a wireless base unit provides for communication of telephone and high-speed data (e.g., Internet data) to each one of a number of subscribers equipped with a wireless transceiver unit at a fixed location, for example, a home residence. The transceiver units are electrically powered at the home residence, and have control and traffic channels available for communication with the wireless base unit. Any problems, such as power or communication failures, for some or all of a large number (e.g., 1000's) of wireless transceiver units served by a wireless base unit need to be handled in an appropriate and efficient manner. In addition, bandwidth is limited and needs to be efficiently utilized. Thus, there is an existing need to efficiently obtain information about and from transceiver units in such systems.

SUMMARY OF THE INVENTION

Polling methods and apparatus for use in a wireless communication system, such as a fixed wireless communication system, are described. The polling method includes the steps of sending, from a wireless base unit, an information request message; receiving, at a wireless transceiver unit, the information request message; sending, from the wireless transceiver unit, information responsive to the information request message; and receiving, at the wireless base unit, the information. The above steps are preferably repeated on a regular or a periodic basis. The information that is polled for may be, for example, status information, configuration data, or call record data.

The polling method may be initiated upon detecting a problem or failure, such as detecting a power failure at the wireless transceiver unit or a communication failure over a data traffic channel available between the wireless base and transceiver units. After detecting such a failure, the data traffic channel may be torn down to conserve power at the wireless transceiver unit. The polling methods may also involve sending an information request message over a broadcast channel, such that a plurality of wireless transceiver units are simultaneously polled. Here, each wireless transceiver unit delays a random period of time before sending its information back to the wireless base unit over a channel that is shared amongst the transceiver units.

BRIEF DESCRIPTION OF THE DRAWINGS

FIG. 13 is a diagram illustrating an Unsolicited CAC (UCAC) Message structure.

FIG. 14 is a diagram illustrating an Solicited CAC (SCAC) Message structure.

FIG. 15 is a diagram illustrating an Installation CAC (INST) Message structure.

FIG. 16 is a table of field descriptions.

FIG. 17 is a diagram illustrating CLC Message structure.

FIG. 18 is a diagram illustrating CLC HSN Message structure.

DETAILED DESCRIPTION OF THE PREFERRED EMBODIMENTS

Figure 1:
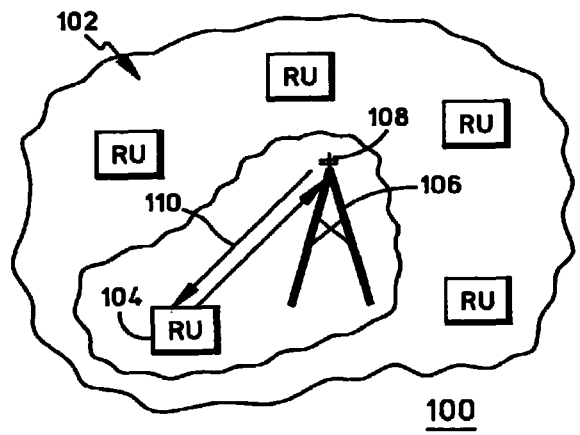
FIG. 1 is an illustration of a wireless communication system which may embody the present invention, the wireless communication system including at least one wireless base unit and a plurality of wireless transceiver units.

FIG. 1 is an illustrative representation of a wireless communication system 100. Wireless communication system 100 includes at least one wireless base unit 106 having one or more antennas 108, and a plurality of remote units 102 ("RUs" or "wireless transceiver units"), such as a wireless transceiver unit 104. Wireless base unit 106 and wireless transceiver units 102 communicate via radio frequency (RF) signals, such as RF signals 110 between wireless base unit 106 and wireless transceiver unit 104. Wireless communication system 100 can make use of a number of additional different communication techniques, such as frequency division multiplexing (FDM) or orthogonal frequency division multiplexing (OFDM). Preferably, wireless communication system 100 is a fixed wireless system (FWS), where wireless base unit 106 provides telephone and high-speed data communication to each one of a number of fixed-location subscribers equipped with a wireless transceiver unit (e.g., at home residences). Here, wireless communication system 100 is a Personal Communication System (PCS) Wireless Access Network (PWAN).

Wireless communication link 110 includes a plurality of channels available between wireless base unit 106 and wireless transceiver units 102. The plurality of channels include one or more control channels, one or more voice traffic channels, and one or more data traffic channels. Voice traffic channels are utilized for bi-directional communication of voice signals, whereas data traffic channels are utilized for bi-directional communication of high speed data, such as Internet data. Each voice traffic channel is dedicated to a voice communication call upon assignment ("circuit-switched" type), whereas each data traffic channel is available for use by multiple transceiver units using a data packet protocol ("packet-switched" type). Voice traffic channels are assigned and active only during voice calls, whereas data traffic channels are typically always active. In the OFDM communication embodiment described, each channel can be identified by a unique combination of frequency and time slots. If there are sixteen frequency slots and eight time slots, for example, one traffic channel may be identified by frequency slot three and time slot seven, another traffic channel may be identified by frequency slot three and time slot two, and even another traffic channel may be identified by frequency slot five and time slot six, etc.

Figure 3:
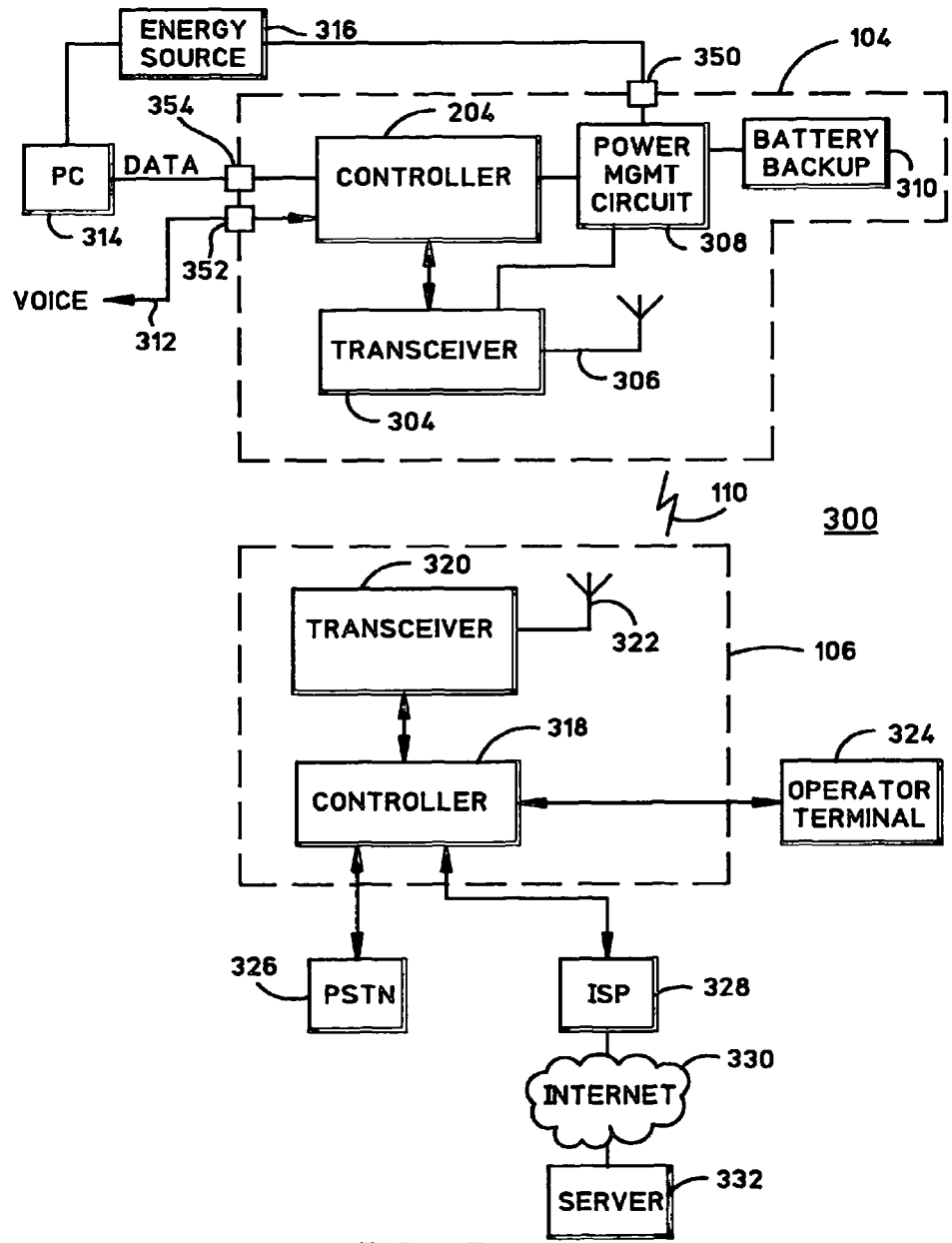
FIG. 3 is a schematic block diagram of a wireless transceiver unit and a wireless base unit of the wireless communication system of FIG. 1.

FIG. 3 is a schematic block diagram of wireless transceiver unit 104 and wireless base unit 106 of wireless communication system 100 of FIG. 1. Wireless transceiver unit 104 includes a controller 302, a wireless transceiver 304, an antenna 306, power management circuitry 308, and battery backup circuitry 310. Wireless transceiver unit 104 also has an energy source interface 350, a telephone interface 352, and a computer interface 354. Energy source interface 350 is adapted for coupling to an energy source 316 that provides electrical power to wireless transceiver unit 104. Telephone interface 352 is used for receiving and sending voice signals 312 of a telephone or voice communication call. Computer interface 354 is adapted for coupling to a personal computer (PC) 314 or other computer device to facilitate communication of high speed data (such as Internet data).

Energy source 316 may be, for example, an alternating current (AC) source provided from an electrical outlet of a home residence. Here, power management circuitry 308 provides conventional AC to direct current (DC) conversion. Power management circuitry 308 receives the electrical energy and provides it in appropriate form to controller 302 and wireless transceiver 304 for electrically powering such circuitry. If energy source 316 becomes unavailable to wireless transceiver unit 104 for some reason (e.g., power outage, plug is pulled, etc.), power management circuitry 308 provides a switching function so that electrical energy is provided from battery backup circuitry 310. Battery backup circuitry 310 includes, for example, an interface (not visible) for coupling to one or more battery cells, such as off-the-shelf DC batteries.

Having similar functionality as wireless transceiver unit 104, wireless base unit 106 includes a controller 318, a wireless transceiver 320, and an antenna 322. An operator terminal 324, such as a PC, may be coupled to wireless base unit 106 to access information from a wireless transceiver unit via polling methods. Operator terminal 324 may be part of a network operating center. Wireless base unit 106 is also coupled to a Public Switched Telephone Network (PSTN) 326 and, for access to the Internet 330, an Internet Service Provider (ISP) 328. Wireless transceiver unit 104 and wireless base unit 106 help facilitate telephone or voice calls for a user over PSTN 326. In addition, wireless transceiver unit 104 and wireless base unit 106 help facilitate data communications for PC 314, which may access one or more servers, such as a server 332, available over the Internet 330.

During a voice call, outbound voice signals spoken by a user are received at controller 302, coded and modulated, and transmitted from transceiver 304 and antenna 306 via RF communication signals. The RF signals are transmitted over one of the dedicated voice traffic channels, received at wireless base unit 106, demodulated and decoded to reproduce the voice signals, and routed accordingly over PSTN 326 to another subscriber. On the other hand, inbound voice signals are received over PSTN 326 by controller 318, coded and modulated, and transmitted from transceiver 320 and antenna 322 via RF communication signals. These RF signals are transmitted over one of the dedicated voice traffic channels, received by wireless transceiver unit 104 at antenna 306 and wireless transceiver 304, demodulated and decoded to reproduce the voice signals for the user to listen to.

During data communications, outbound data packets from PC 314 are received at controller 302, coded, modulated, and transmitted from transceiver 304 and antenna 306 via RF communication signals. The RF signals are transmitted over one of the data traffic channels. These RF communication signals are received at wireless base unit 106, demodulated, and decoded to reproduce the data packets. These data packets are routed accordingly to over the Internet 330 to server 332 via ISP 328. On the other hand, inbound data packets are received from server 332 at controller 318, coded, modulated, and transmitted from transceiver 320 and antenna 322 via RF communication signals. These RF signals are transmitted over a data traffic channel (each of which are shared by multiple transceiver units), received by wireless transceiver unit 104 at antenna 306 and wireless transceiver 304, demodulated, and decoded to reproduce the data packets. The destination addresses must match that assigned to PC 314 for PC 314 to receive the data packets. Under normal operating conditions, the data traffic channel is typically always active and wireless transceiver unit 104 must continuously monitor such channel to receive its data packets.

Figure 2:
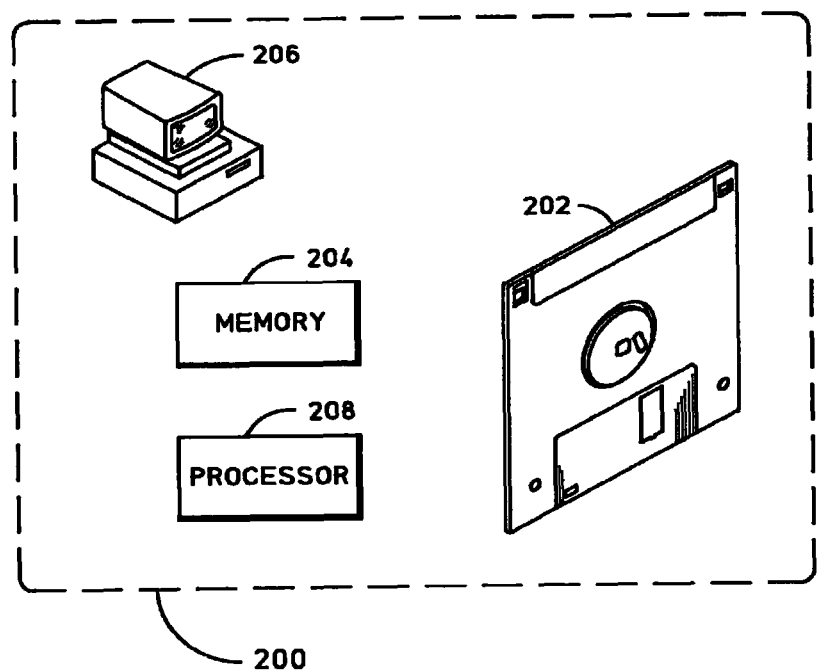
FIG. 2 is an illustration of software components which are suitable for use in implementing the inventive methods described herein.

In such an environment, wireless base unit 106 performs "polling" methods with the plurality of wireless transceiver units 102. Polling is performed to obtain information from wireless remote units 102 to ensure that devices are operating or operating properly, in accordance with some predefined specification. Polling may also be performed to obtain information to facilitate subscriber services, for example, to maintain event logs. Referring to FIG. 2, the methods described herein may be embodied and implemented in wireless transceiver unit 104 and wireless base unit 106 of FIG. 1 (as well as other transceiver and base units) in connection with software using software components 200 shown in FIG. 2. The software may be embedded in or stored on a disk 202 or memory 204, executable on a computer 206 or a processor 208. Thus, the inventive features may exist in a signal-bearing medium which embodies a program of machine-readable instructions executable by a processing apparatus which perform the methods.

The information for which polling is performed may be any suitable information, such as, for example, status information, configuration information, or call record information. Status information may be or include, for example, mere acknowledgement, operating condition information, operating mode information, previous usage information, etc. Configuration information may be or include, for example, reception and transmission parameters for the wireless transceiver unit. Configuration information is typically preprogrammed into and may be unique to each wireless transceiver unit. More particularly, configuration information is typically programmed into an Electrically Erasable/Programmable Read-Only Memory (EEPROM) (not shown) coupled to controller 302 (FIG. 3). Call record information may be or include, for example, an identification of a plurality of telephone calls made and/or received over a period of time, timestamps of the previous calls, durations of the previous calls, the number of previous calls, etc.

A wireless base unit polls one or more wireless transceiver units with use of what is referred to as an information request message. In its simplest form, an information request message merely instructs or requests the sending of information. On the other hand, an information request message may include data indicative of a particular information type. Using the examples above, the information types may include a status type, a configuration data type, and a call record type. Upon receipt of an information request message, a wireless transceiver unit reads the data indicative of the particular type, and selects and/or generates and sends the appropriate information corresponding to that type. The wireless transceiver unit may send all of the information associated with the information type. Each information type, however, may be further divided into subtypes. In call record types, for example, the subtypes may be a call identification type, a call timestamp type, a call duration type, a call number type, etc., each corresponding to particular call record information previously mentioned above. Here, upon receipt of an information request message, a wireless transceiver unit reads the data indicative of the particular information type and subtype, and selects and/or generates and sends only the information corresponding to that subtype within the type.

Figure 4:
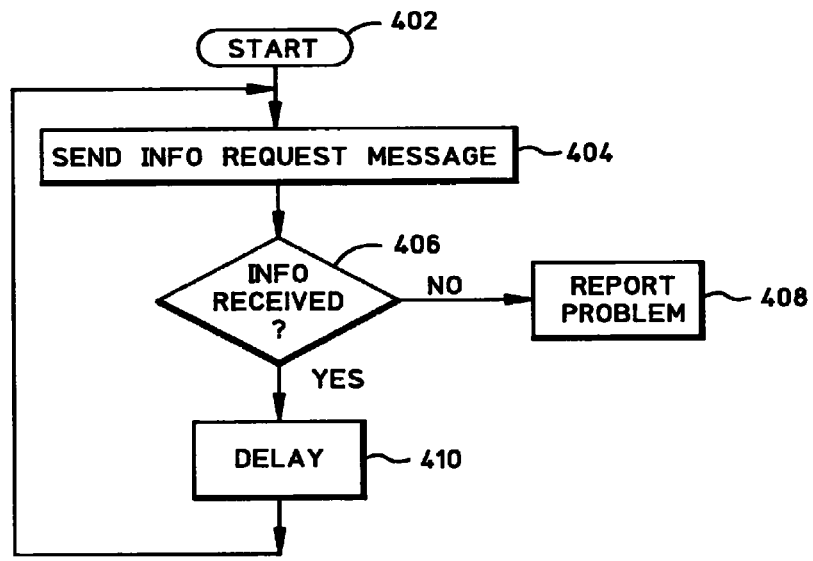
FIG. 4 is a flowchart describing a polling method for use by the wireless base unit.
Figure 5:
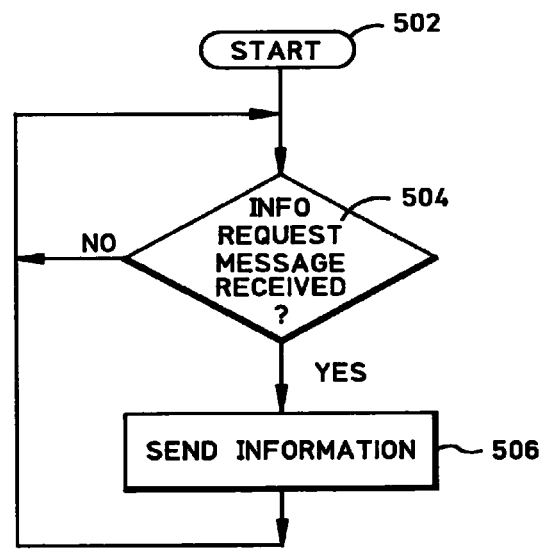
FIG. 5 is a flowchart describing a polling method for use by the wireless transceiver unit which is associated with the flowchart of FIG. 4.

FIG. 4 is a flowchart describing a general polling method for use by wireless base unit 106 of FIG. 1. Beginning at a start block 402, wireless base unit 106 sends an information request message that is intended for receipt by wireless transceiver unit 104 (step 404). Wireless base unit 106 waits for a response at step 406. If no response is received over some predetermined time period, wireless base unit 106 reports the lack of response to, for example, a database or operator terminal 324. If a response is received at step 406, wireless base unit 106 delays for some predetermined time period (step 410). Upon expiration of the time period, wireless base unit 106 repeats the process beginning at step 404 such that polling is performed on a periodic basis for one or more wireless transceiver units. From the viewpoint of wireless transceiver unit 104, and beginning at a start block 502 of FIG. 5, wireless transceiver unit 104 waits to receive the information request message from wireless base unit 106 (step 504). Upon receipt of such message, wireless transceiver unit 104 selects the appropriate information and sends it to wireless base unit 106 (step 506). This process repeats for each information request message sent from wireless base unit 106, such that polling is performed on a periodic basis. For example, the polling may be performed for one or more wireless transceiver units (sequentially or simultaneously) every five minutes.

The information request message may include an information type and/or subtype as described above, where wireless transceiver unit 104 must select from several information to send in accordance with the type and/or subtype. In addition, any suitable type of information may be obtained during such polling. In one example, wireless base unit 106 polls for status information. As another example, wireless transceiver unit 104 may store call record information as previously described. This information may be obtained periodically for comparison and updating of call information stored in a database accessible to wireless base unit 106.

As described, polling may be performed on a periodic basis to monitor the status of a number of different wireless transceiver units. The polling need not be "periodic" in a strict sense, however; the polling need only be performed on some regular timed basis. In an alternate embodiment, in lieu of repeating the polling periodically, operator terminal 324 may initiate an "ad hoc" poll when needed. Here, operator terminal 324 sends a message to wireless base unit 106 that causes it to poll a particular wireless base unit for particular information (e.g., using type/sub-type). Here, a single poll is performed per request; that is, no periodic polling is performed. This ad hoc polling may be used, for example, to obtain configuration information of a wireless transceiver unit that is not operating properly. In this application, new configuration information may be obtained by the network operating center where wireless transceiver unit 104 is reprogrammed "over-the-air" to correct the problem. Ad hoc polling may also be employed in combination with the periodic polling described in relation to FIGS. 4 and 5.

If polling for information from a single wireless transceiver unit, then an information request message is sent only to that unit. On the other hand, if the polling is for information from multiple transceiver units, then the information request message is broadcast to all of the units simultaneously. In a slotted ALOHA type system of the preferred embodiment, for example, wireless base unit 106 may use a Common Link channel (CLC) to send the message and a Solicited Common Access channel (S-CAC) to receive the information, such that a single transceiver unit is polled. On the other hand, wireless base unit 106 may use a Broadcast Control channel (BRC) to send the message and an Unsolicited Common Access channel (U-CAC) to receive the information, such that multiple transceiver units are simultaneously polled. This method is described in more detail later below.

Figure 6:
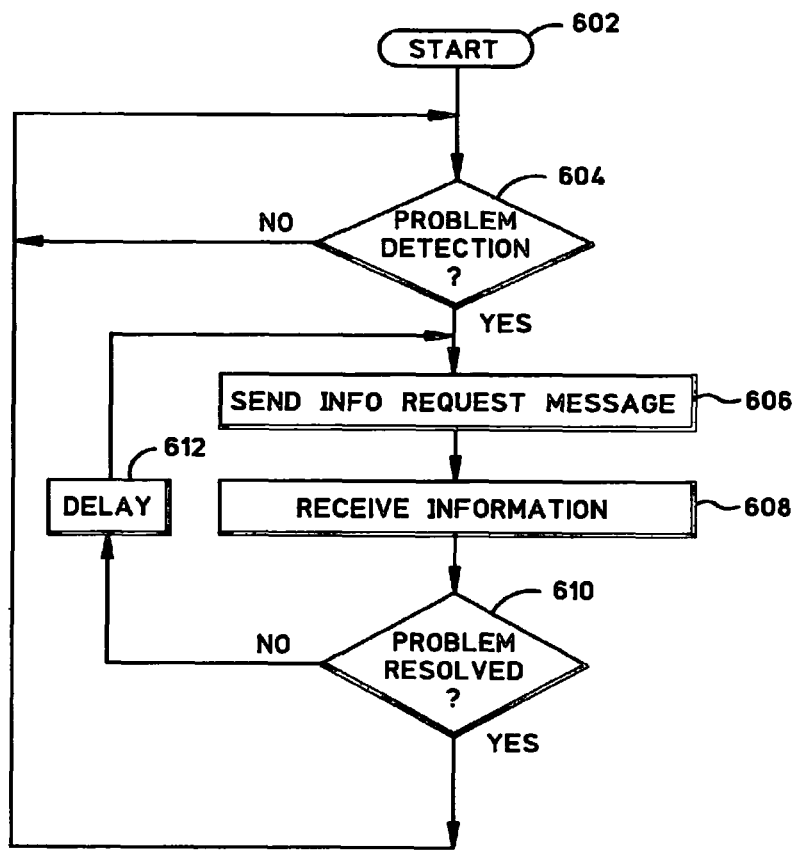
FIG. 6 is a flowchart describing another polling method for use by the wireless base unit, which involves detection of a problem or failure.

FIG. 6 is a flowchart describing another polling method for use by wireless base unit 106. Beginning at a start block 602, steady state operation is assumed where no polling is occurring. Wireless base unit 106 detects a problem within the system (step 604). In response, wireless base unit 106 initiates the polling process, sending an information request message (step 606), receiving information (if at all) (step 608), and delaying for a predetermined time period (step 612) before repeating the sending and repeating. The problem detected may be, for example, a communication failure or a power failure. If it is detected that the problem has been corrected (step 610), then polling ceases where wireless base unit 106 discontinues the sending of information request messages. The method is repeatable, beginning again at step 604.

A communication failure may occur, for example, when high speed data traffic cannot be (accurately) detected over the data traffic channel. Here, controller 318 detects a communication failure and, in response, the polling is initiated. On the other hand, a power failure may occur when energy source 316 is unavailable to wireless transceiver unit 104. In this case, power management circuitry 308 switches battery backup circuitry 310 to electrically power wireless transceiver unit 104 for seamless operation. Controller 302 detects the loss of this primary energy source 316 and, in response, sends a message to wireless base unit 106 indicating the same. Wireless base unit 106 receives and detects this problem message and, in response, the polling is initiated.

An additional advantageous step may be included where wireless units 104 and 106 tear down the established data traffic channel after the power failure is detected. A data traffic channel is normally maintained by each unit by sending "keep alive" messages back and forth to one another over the data traffic channel. In tearing down the data traffic channel, then, these messages are no longer sent nor received. Voice communication, however, may still be advantageously maintained even though the data traffic channel is torn down.

Figure 7:
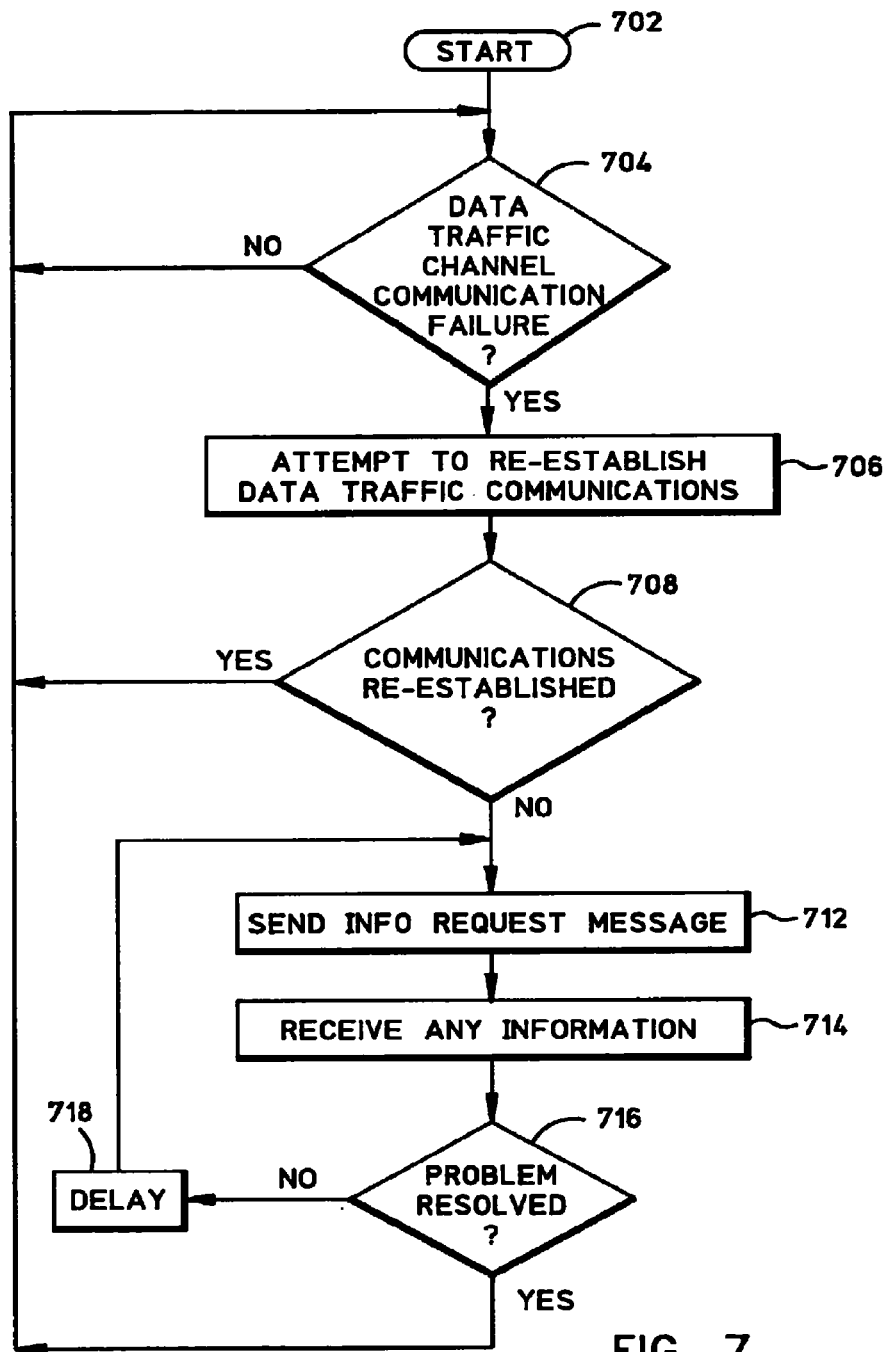
FIG. 7 is a flowchart describing another polling method for use by the wireless base unit, which involves a communication failure over a data traffic channel.

FIG. 7 is a flowchart describing a polling method which relates to the detection of a communication failure over the data traffic channel. Beginning at a start block 702, wireless base unit 106 detects a communication problem with wireless transceiver unit 104 over a data traffic channel (step 704). In response, wireless base unit 106 attempts to reestablish data traffic communications with wireless transceiver unit 104 (step 706). If communication is not successfully reestablished (step 708), periodic polling is initiated with wireless transceiver unit 104, where wireless base unit 106 sends an information request message to wireless transceiver unit 104 over a control channel (step 712), receives information from wireless transceiver unit 104 (step 714), and delays some predetermined time period (step 718) before sending additional information request messages. If the problem is resolved (step 716), the process repeats as shown beginning at step 704.

Figure 8:
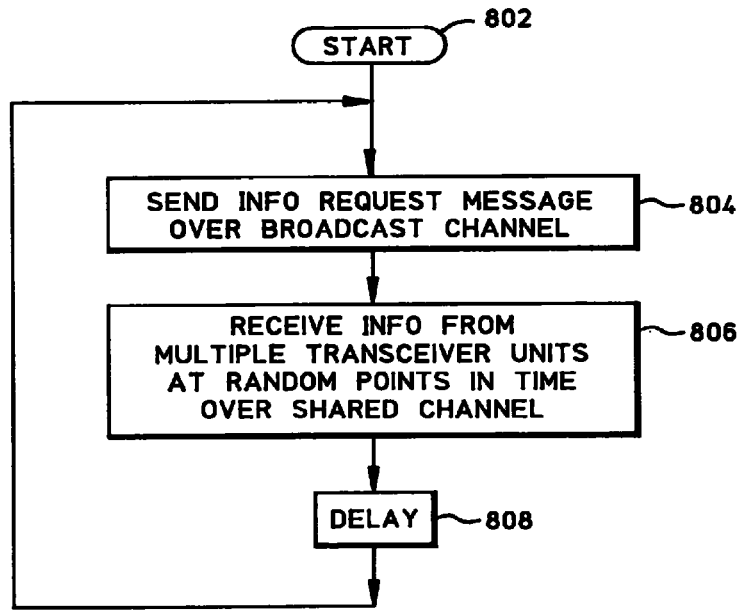
FIG. 8 is a flowchart describing another polling method for use by the wireless base unit, which involves polling multiple transceiver units simultaneously.
Figure 9:
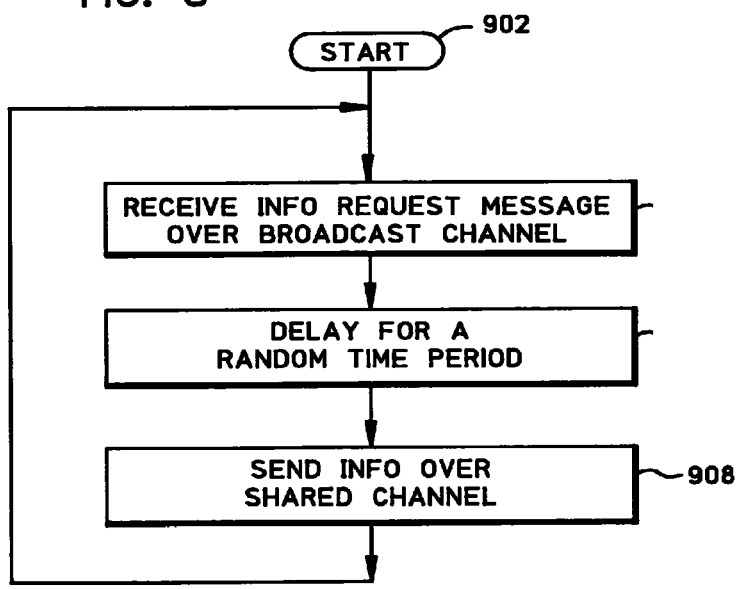
FIG. 9 is a flowchart describing another polling method for use by the wireless transceiver unit, which is associated with the flowchart of FIG. 8.

FIGS. 8 and 9 are flowcharts describing polling methods which involve the simultaneously polling of a plurality of wireless transceiver units. FIG. 8 corresponds to steps performed at a wireless base unit, whereas FIG. 9 corresponds to steps performed at each wireless transceiver unit. Beginning at a start block 802 of FIG. 8, wireless base unit 106 sends a single information request message over a broadcast channel (step 804). This channel may be what is known as a Broadcast channel or BRC. Since it is sent over the broadcast channel, the message is intended for receipt by each wireless transceiver unit 102 that wireless base unit 106 serves. In response, wireless base unit 106 receives information from multiple wireless transceiver units at random points in time over a channel that is shared amongst the plurality of wireless transceiver units 102 (step 806). This channel may be what is known as an Unsolicited Common Access channel or U-CAC. Wireless base unit 106 might not receive information from those one or more wireless transceiver units having failures or problems. Wireless base unit 106 may report the lack of response (problem) for each transceiver unit that did not respond. Next, wireless base unit 106 delays some amount of time (step 808) before repeating the process again beginning at step 804. Preferably, wireless base unit 106 delays for some predetermined time so that its polling is performed on a periodic basis.

From the perspective of each wireless transceiver unit, beginning at a start block 902 of FIG. 9, wireless transceiver unit 104 receives the information request message from the wireless base unit over the broadcast channel (step 904). Wireless transceiver unit 104 delays for some random period of time upon processing the message (step 906). Here, wireless transceiver unit 104 selects a random number using a random number generator and accordingly sets up a timer to expire. After the appropriate delay has occurred, wireless transceiver unit 104 sends information responsive to the information request message over the shared channel (step 908). The process repeats for each information request message sent by wireless base unit. It is noted that after step 904, each wireless transceiver unit 102 does not initially attempt to send its information at the first time available.

Although each wireless transceiver unit sends its information after waiting some random amount of time, all wireless transceiver units send the information within some predefined time period. This predefined time period is less than the delay by wireless base unit 106 utilized in step 808 of FIG. 8. In addition, it is preferred that each wireless transceiver unit 102 feeds a "seed" to its random number generator. The seed is preferably an identification number that is unique to the wireless transceiver unit, such as a hardware serial number. This helps ensure that each wireless transceiver unit does not transmit at the same time as any other wireless transceiver unit.

Thus, polling methods and apparatus for use in a wireless communication system, such as a fixed wireless communication system, have been described. One polling method includes the steps of sending, from a wireless base unit, an information request message; receiving, at a wireless transceiver unit, the information request message; sending, from the wireless transceiver unit, information responsive to the information request message; and receiving, at the wireless base unit, the information. The above steps are preferably repeated on a regular or a periodic basis. The information that is polled from the wireless transceiver unit may be, for example, status information, configuration data, or call record data.

The polling method may be initiated upon detecting a problem or failure, such as detecting a power failure at the wireless transceiver unit or a communication failure over a data traffic channel available between the wireless base and transceiver units. After detecting such a failure, the data traffic channel may be torn down to conserve power at the wireless transceiver unit. The polling methods may also involve sending an information request message over a broadcast channel, such that a plurality of wireless transceiver units are simultaneously polled. Here, each wireless transceiver unit delays a random period of time before sending its information back to the wireless base unit over a channel that is shared amongst the transceiver units to avoid simultaneous transmission.

Chapter 3 PWAN Data Link Layer—Voice Medium Access Control (VMAC)

Overview

The Personal Communication System (PCS) Wireless Access Network (PWAN) data link layer consists of two sublayers, the data link control (DLC) and the medium access control (MAC). Each sublayer is defined independently and interfaces to adjacent layers through a set of primitives. This chapter defines the MAC.

3.1 Overview

Figure 10:
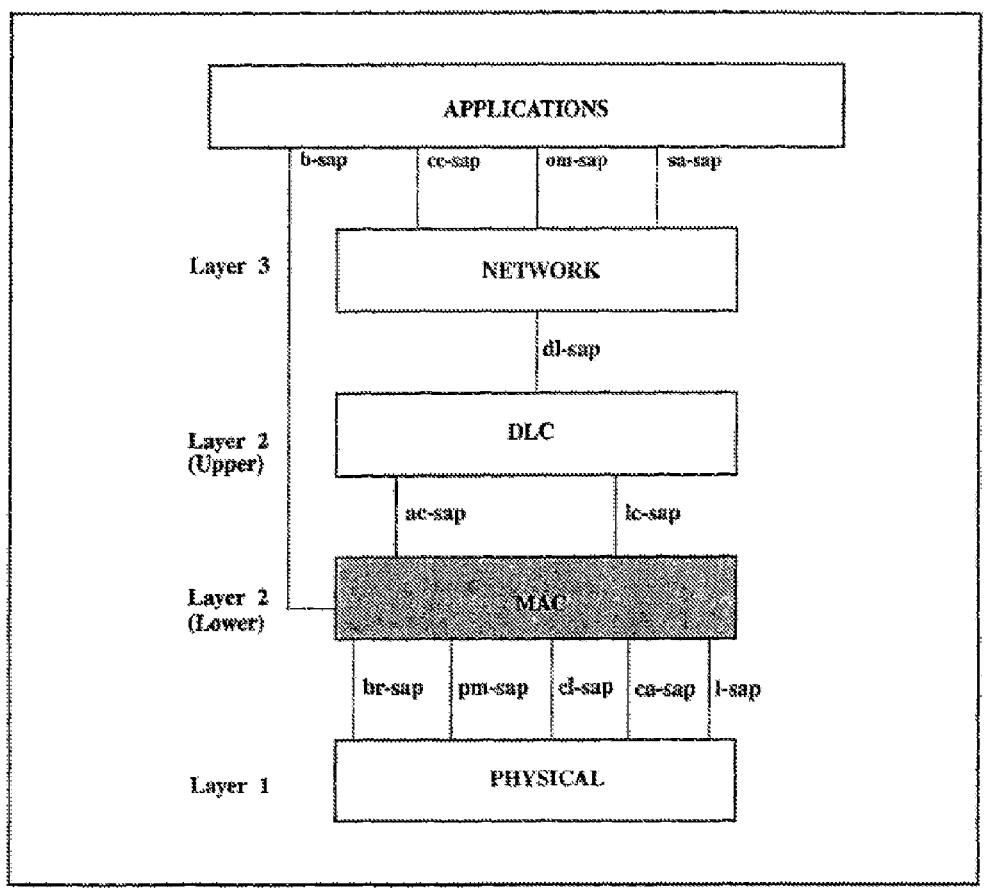
FIG. 10 is a diagram illustrating a PWAN Protocol Profile.

FIG. 10 demonstrates the layered architecture for the PWAN system and highlights the MAC sublayer defined in this chapter. As far as is possible, this document makes use of the layering principles of the Reference Model for Open System Interconnection (OSI) as contained in International Telegraph and Telephone Consultative Committee (CCITT) recommendations X.200 and X.210. The PWAN data link layer consists of two sublayers, the DLC and the MAC sublayer. Each sublayer is defined independently and interfaces to adjacent layers through a set of service access points (SAPs).

3.1.1 Medium Access Control Service Characteristics

The MAC interfaces to adjacent layers by the use of protocol primitives defined in this chapter. The MAC interfaces with the DLC, which resides above the MAC. The MAC also interfaces with the airlink physical layer, which resides below the MAC. The MAC provides interfaces to a local Radio Management Entity (RME) and to a broadcast control application.

3.1.2 Services Provided to the Data Link Control Layer

The MAC provides orderly and efficient use of the airlink physical layer to the DLC. Two services are provided by the MAC: access control service and link control service.

3.1.2.1 Access Control Service

The access control service provides a mechanism for the DLC to set up physical channels from either the Base or Remote Unit (RU). The MAC layer is responsible for the attachment of a cyclic redundancy check (CRC) checksum to access control messages prior to submittal to the physical layer. The CRC is checked on the receiving end to detect errors in transmission.

3.1.2.2 Link Control Service

Link control service provides physical layer access to messages submitted from the DLC for link control functions. Further, link control service provides a prioritized data delivery service, as well as segmentation and reassembly of long messages. Link control service handles a CRC-16 checksum for link control messages prior to submittal to the physical layer or upon reception from the physical layer.

3.1.3 Services Provided to the Applications

Broadcast service provides a means for the applications to access the broadcast medium. In the Base, this service is required for transmitting broadcast messages; in the RU, this service is required for receiving broadcast messages.

3.1.4 Services Required from the PWAN Airlink Physical Layer

The physical layer (layer1) is the lowest layer in the OSI Reference Model and it supports all functions for the transmission of bit streams on the physical medium. These bit streams are transferred on traffic and control channels. The following are some of the major services required of the physical layer:

The ability to generate a physical airlink connection (simplex or full duplex) for the transmission of bits in the same order in which they are submitted to the physical layer A broadcast capability between a Base and multiple RUs.

3.2 PWAN MAC Layer Architecture

Figure 11:
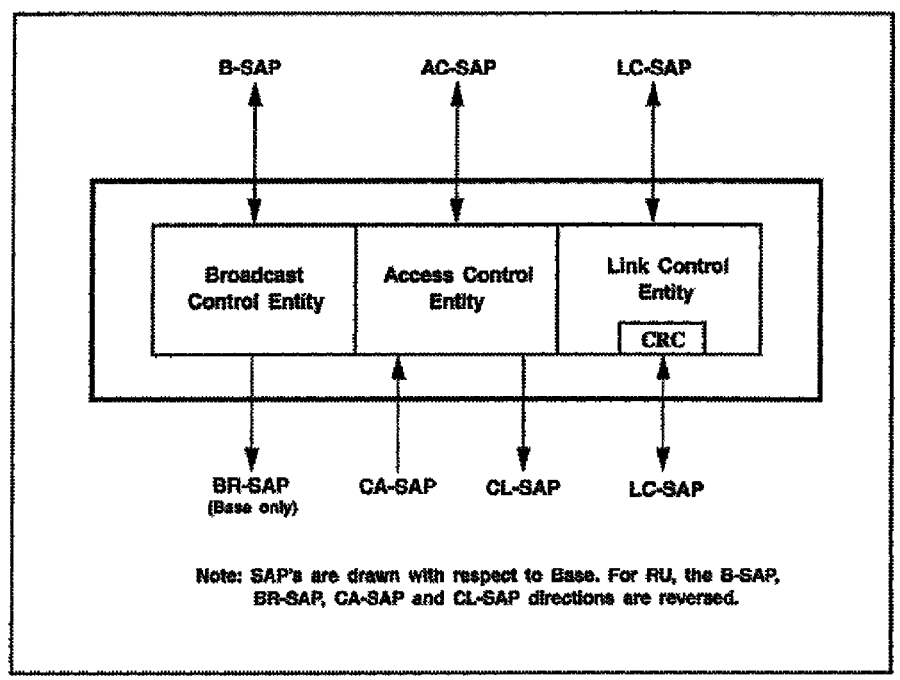
FIG. 11 is a diagram illustrating MAC Layer Architecture.

FIG. 11, "MAC Layer Architecture" shows the internal architecture of the MAC. This section provides a high-level description of the MAC entities. Internal MAC entities include access control, link control, broadcast control, segmentation, reassembly, and CRC. SAPs provide communication channels to other layers in the system.

3.2.1 Access Control Entity

This entity provides the functions necessary to gain access to the physical layer services. It communicates with the DLC via the AC-SAP. The access control entity communicates with the physical layer via the common access SAP (CA-SAP) and the common link SAP (CL-SAP).

3.2.2 Link Control Entity (LCE)

The link control entity accepts service requests for data transferred from the DLC and performs the necessary transformations to submit the information to the physical layer. This link control entity utilizes the services of segmentation for its messages at the DSP physical layer. Messages are segmented into 1-byte segment before being delivered through the airlink. On reception of a message, link control computes the CRC to detect errored frames. If no errors are found, the link control entity forwards the message to the DLC layer.

3.2.3 CRC Block

The CRC appended to each packet provides a method of detecting errors in received packets for link control channel (LCC) messages since the physical layer (DSP) splits the payload before transmit them one byte at a time. If a CRC fails then the received message should be discarded.

3.2.4 Broadcast Control Entity

This entity provides a broadcast service from Base to RUs. It communicates with an associated application via the B-SAP. It communicates with the physical layer via the BR-SAP.

3.2.5 Service Access Points

The MAC layer communicates with adjacent layers through its SAPs, including the AC-SAP, LC-SAP, L-SAP, CL-SAP, CA-SAP, B-SAP, and BR-SAP. Table 3.1, "MAC Layer Service Access Points," lists the SAPs and briefly describes each one.

TABLE 3.1

MAC Layer Service Access Points

| SAP | Name | Description |
| --- | --- | --- |
| AC-SAP | Access SAP | Provides a mechanism for the DLC to request services from the MAC Access Control Entity. |
| LC-SAP | Link Control SAP | Provides a mechanism for the DLC to provide and receive Packet Data Units (PDUs) to and from the MAC link controller. |
| L-SAP | Link SAP | Provides a path to the physical layer through which all PDUs bound for the LCC channel flow. |
| CL-SAP | Common Link SAP | Provides a mechanism for the MAC Access Control entity to provide CLC PDUs to the physical layer for transmission over the CLC physical channel at the Base. Provides a receive path at the RU for CLC PDUs. |
| CA-SAP | Common Access SAP | Provides a mechanism for the MAC Access Control entity to provide CAC PDUs to the physical layer for transmission over the CAC physical channel at the RU. Provides a receive path at the Base for CAC PDUs. |
| BR-SAP | Broadcast SAP | Provides a mechanism for the MAC Broadcast entity to provide BC PDUs to the physical layer at the Base and receive BC PDUs at the RU. |
| B-SAP | Broadcast SAP | Provides a mechanism for an application at the base to utilize the BC channel. Provides a mechanism at the RU for an application to receive data from the BC channel. |

3.3 Elements of Procedures for Peer-to-Peer Communication

3.3.1 Overview

This section defines the messages and message formats used for peer-to-peer communication between MAC entities.

For each functional entity of the MAC, a separate set of messages is defined. The basic functions supported are access control, link control, and broadcast control.

3.3.2 Access Control

3.3.2.1 Access Control Mechanism

The access control mechanism provides the Base and its constituent RUs with a mechanism to communicate prior to the setup of a connection-oriented datalink for the purposes of:

Setup of a connection-oriented traffic and associated data link channel

RU periodic polling (audit)

RU sleep state reporting

The access control mechanism uses CAC and CLC channels for this communication. The physical layer provides the following CAC/CLC channels/code keys per subband pair for use by access control.

One CLC channel with one code key

Two CAC channels with two code keys each

RUs are assigned to a particular subband pair and CAC channel as part of the start-up procedure (refer to the Broadcast Channel description for more details).

Messages transmitted over the CAC channel can be sent in either a solicited or unsolicited fashion.

3.3.2.2 Unsolicited CAC Transmissions

When the RU initiates a call (i.e., originating call) or reports power or sleep status to the Base, the RU will use an unsolicited transmission approach. That is, the RU will transmit the CAC message in the first available time division multiple access (TDMA) slot (refer to Section 3.3.2.5 for details) and will not wait to be scheduled.

Slotted ALOHA access scheme is used for the unsolicited CAC (UCAC) transmissions. If the unsolicited CAC transmission is not acknowledged by the Base via the CLC in some given period of time (t_mac-access) then the RU will wait a random period of time (t_mac-AccessBackoff) before re-trying the unsolicited CAC transmission. This process will continue up to a provisionable number of times (n_mac-access).

3.3.2.3 Solicited CAC Transmission

After the initial access to the PWAN, the RU can use a scheduled CAC channel for the remainder of a call establishment procedure in a pre-defined dynamic slot assignment (DSA)-TDMA scheme (refer to Section 3.3.2.5 below).

An RU should be guaranteed collision-free transmission on the CAC at this time.

3.3.2.4 Installation CAC Transmission

Since RU id is dynamically assigned by the WEMS, certain messages exchanging during start-up have to use the RU Hardware Serial Number (HSN) as identifier. The transmission mechanism can be both unsolicited and solicited. Currently, all installation CAC are unsolicited.

3.3.2.5 DSA-TDMA for CAC/CLC Channels

The CAC and CLC messages that are used for RU access to the PWAN use a DSA-TDMA scheme to access the medium. Each CAC or CLC message is transmitted in a 12 ms slot. Slots are counted in a relative sense at both the Base and RU and are assigned dynamically throughout the call establishment procedure.

A slot is simply a 12 ms frame. The Base and RU maintain a slot count from one to n_mac-dsaslots, where n_mac-dsaslots is a provisionable value, that is the same at both the RU and the Base. At any given time, the current value of the slot count may not necessarily be equal at the Base and RU.

Figure 12:
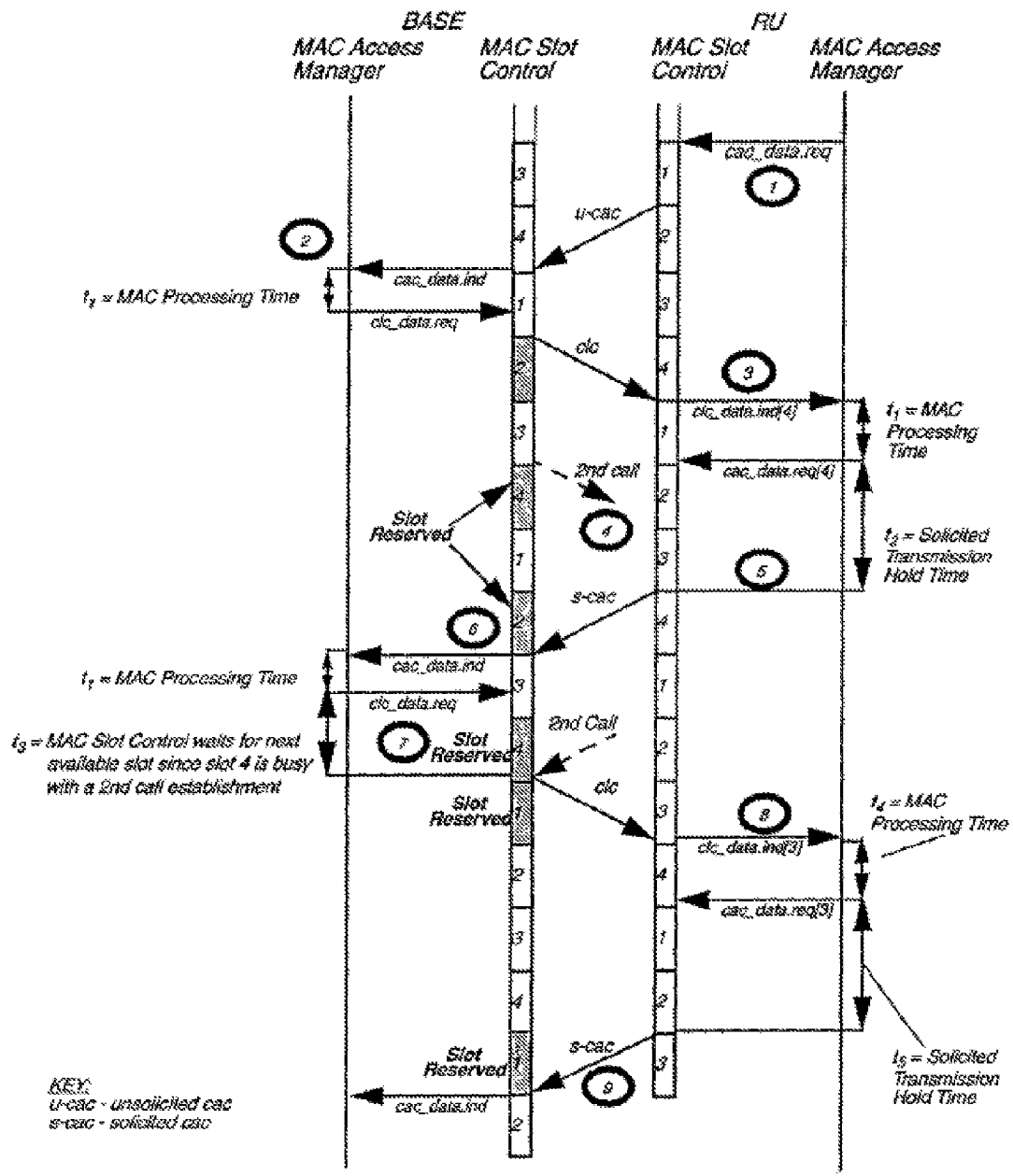
FIG. 12 illustrates DSA-TDMA Procedure for Solicited CAC Transmissions.

FIG. 12 illustrates the DSA-TDMA procedure.

FIG. 12 is based on an originating call message sequence chart. The particular messages being transmitted and received are not important in this context, rather the method or procedure in which the slot resources are managed at the Base and RU to accomplish the solicited messaging. The example is described in detail below and the paragraph numbering is cross-referenced to the circled numbers in FIG. 12.

1. The RU is required to originate a connection and will therefore transmit an ACCESS message using the UCAC channel in the first available slot. The retry mechanism is of a slotted ALOHA nature.
2. The Base MAC access manager receives the ACCESS in the form of a cac-data.ind primitive. The MAC will process this message and, if bandwidth in the cell is available, will reply to the accessing RU with a CONNECT message via the CLC channel.
   The CONNECT message is delivered to the MAC slot control mechanism via a cic-data.req primitive. The MAC slot control entity will transmit the CONNECT message in the next available time slot, which in this case is Base slot #2. The MAC slot control entity in the Base should then start a "watchdog timer" (T1) associated with Slot #2. If a solicited CAC message is not received in this time slot within this time, the MAC slot control entity should "free" the slot.
3. The RU MAC slot control entity receives the CONNECT in RU slot number four, and delivers the CONNECT to the RU MAC access manager via a cic-data.ind tagged with slot number 4. The RU MAC access manager will process the CONNECT message and will submit a CONNECT-ACK message via a cac-data.req primitive to the MAC slot control entity. The MAC access manager will tag this primitive with the slot number four, representing the slot in which the associated CONNECT message was received. (Note that the slot number (four) is not used by the RU MAC access manager)
4. This example shows that a second simultaneous link establishment is occurring with perhaps the same or a second RU using Base slot number four; i.e., Base slot number four is now busy.
5. The RU MAC slot control entity receives the cac-data.req primitive containing the CONNECT-ACK message. This message will be transmitted using the solicited CAC (s-cac) key in RU slot number four. This implies that the MAC slot control entity will need to defer the message until RU slot number four becomes available. This is an inherent delay in the solicited TDMA approach.
6. The Base MAC slot control entity receives the CONNECT-ACK message during Base slot number two, as expected. The Base MAC slot control entity will free up slot number two as a resource that may be used by other Base MAC access managers, and then reset and disable the "watchdog timer" T1
7. The Base MAC access manager processes the CONNECT-ACK message and responds with a DELAY message and submits this message via a cic-data.req primitive to the Base MAC slot control entity during Base slot number three. The Base MAC slot control entity waits until the next available slot to transmit this message over the CLC channel. In this case, the next available slot is Base slot number one, since slot number four is busy with a second call establishment. The message is transmitted in Base slot number one and watchdog timer T1 is again enabled.
8. The RU MAC slot control entity receives the DELAY message during RU slot number three. The DELAY message is delivered to the RU MAC access manager and tagged with the number three. The RU MAC access manager processes this message and responds with a DELAY-ACK message which is delivered in a cac-data.req primitive. The MAC slot control entity will then wait for RU slot number three and will transmit the DELAY-ACK message.
9. The cac-data.ind arrives at the Base during Base slot umber one as expected. The Base MAC slot control entity will free slot number one as a resource that may be used for other Base MAC access managers and resets and disables the watchdog timer T1.

3.3.2.6 Common Access Channel (CAC) Messages

3.3.2.6.1 UCAC Message Specification and Payload Definition

This section describes the message ID and payload field for specific UCAC messages. Note that the payload will start at bit position 0 of Octet 4 of the UCAC message.

CAC Access Message

The access message is sent by the RU to request access to the physical airlink medium.

Message ID=00001 (0x01)

TABLE 3.1

CAC Access Request Message

| Element | Size (Bits) | Description |
|---|---|---|
| Network payload | 8 | Network layer peer-to-peer message. |
| Line ID | 2 | Identifies a particular subscriber line interface circuit |
| Bearer mode | 1 | This bit is used to distinguish a traffic bearer from a non-traffic bearer (i.e., for a connection that requires only data services, data patterns may be optimized) Traffic = 1 Data = 0 |

CAC HSD Access Message

The HSD Access message is sent by the RU to request the establishment of a HSD link.

Message ID=00010 (0x02)

TABLE 3.2

CAC HSD Access Request Message

| Element | Size (Bits) | Description |
|---|---|---|
| Protocol | 4 | The HSD protocol used |
| Preferred Primary Link | 4 | RU choice of primary Data channel |
| Preferred TDMA Map | 8 | RU choice of TDMA channel bitmap |
| Preferred FDMA Map | 16 | RU choice of FDMA channel bitmap |

CAC Deny Message

The Deny message is sent by the RU to terminate an establishing session.

Message ID=00011 (0x03)

TABLE 3.3

CAC Deny Request Message

| Element | Size (Bits) | Description |
|---|---|---|
| Line ID | 2 | The line id |

3.3.2.6.2 SCAC Message Specification and Payload Definition

This section describes the message ID and payload field for specific SCAC messages. Note that the payload will start at bit position 0 of Octet 2 of the SCAC message.

CAC RU Poll Response Message

The CAC RU poll response message is used by the RU to send status information to the Base.

Message ID=00101 (0x05)

TABLE 3.1

CAC Poll Response Message

| Element | Size (Bits) | Description |
|---|---|---|
| RU health | 1 | General indication of RU condition |

CAC Ack Message

This message is used by the MAC to acknowledge the receipt of a CLC message from a peer MAC.

Message ID=00110 (0x06)

TABLE 3.2

CAC Ack Message

| Element | Size (Bits) | Description |
|---|---|---|
| Reserved | 3 | Reserved field |
| Ack type | 5 | Message ID being acknowledged |

CAC Measurement Response Message

This message is used by the RU to report channel quality measurements to the Base. This message is always coupled with the CAC Extended Measurement Response Message.

Message ID=00111 (0x07)

TABLE 3.3

CAC Measurement Response Message

| Element | Size (Bits) | Description |
|---|---|---|
| Version | 2 | Version of measurement response |
| Reserved | 6 | reserved |
| Channel ID 1 | 8 | Channel ID #1 |
| Channel ID 2 | 8 | Channel ID #2 |
| Channel ID 3 | 8 | Channel ID #3 |
| Channel ID 4 | 8 | Channel ID #4 |
| RSSI 1 | 4 | Received Signal Strength #1 |
| RSSI 2 | 4 | Received Signal Strength #2 |
| RSSI 3 | 4 | Received Signal Strength #3 |
| RSSI 4 | 4 | Received Signal Strength #4 |

CAC Extended Measurement Response Message

This message is used by the RU to report channel quality measurements to the Base. This message is always coupled with the CAC Measurement Response Message. The parameters of this message are identical to those of the CAC Measurement Response Message.

Message ID=01000 (0x08)

3.3.2.6.3 Installation Message Specification and Payload Definition

This section describes the message ID and payload field for installation messages. These are all unsolicited messages which use HSN as key identifier.

CAC Install Message

The CAC Install message is used by the RU to send installation information to the Base.

Message ID=00100 (0x04)

TABLE 3.1

CAC Poll Response Message

| Element | Size (Bits) | Description |
|---|---|---|
| Data | 24 | Segmented installation message data |

CAC TxConfig Message

The CAC TxConfig message is used by the RU to start a configuration procedure. There is no payload associated with this message.

Message ID=01000 (0x09)

CAC TxMeas Message

The CAC TxMeas message is used by the RU to allow the DSP to perform power measurement. There is no payload associated with this message.

Message ID=01010 (0x0a)

3.3.2.7 Common Link Channel (CLC) Messages 3.3.2.7.1 CLC Message Specification and Payload Definition This section describes the message ID and payload field for specific CLC messages. Note that the payload will start at bit position 0 of Octet 5 of the CLC message and Octet 8 of CLC HSN message.

3.3.2.7.2 Structure of Specific CLC Messages

This section describes the message ID and payload fields for specific CLC messages.

CLC Connect Message

The CLC connect message is used to provide the RU with all of the necessary physical layer parameters required for establishing the LCC data link and associated traffic bearer for a particular connection session when a constellation size of three bits/modulation symbol is used.

The Base MAC access control entity should utilize the RME via the M-SAP(2a) to obtain these parameters that make up the connect message.

Message ID=00001 (0x01)

TABLE 3.1

CLC Connect Message Payload

| Element | Size (Bits) | Description |
| --- | --- | --- |
| Line Id | 2 | Subscriber line interface circuit |
| Test mode | 1 | 0/1 : normal/test call |
| Channels Used | 1 | Number of channels used for this modulation type |
| Modulation Type | 2 | 0/1 : 16QAM/QPSK; 2,3 : Reserved |
| Delay Value | 10 | Delay compensation |
| Channel ID 1 | 8 | Uplink channel 1 |
| Channel ID 2 | 8 | Uplink channel 2 |
| Downlink bitmap | 8 | Bitmap corresponding to the eight channels sent in CAC Measurement messages 0 : Extended Connect Request message to follow |

CLC Extended Connect Message

This message always follows the Connect Request message when the downlink bitmap field is set to zero. It provides the downlink channels other than those suggested by the RU that the Base wants the RU to listen to.

Message ID=00010 (0x02)

TABLE 3.2

CLC Extended Connect Message Payload

| Element | Size (Bits) | Description |
| --- | --- | --- |
| Channel ID 1 | 8 | Downlink channel 1 |
| Channel ID 2 | 8 | Downlink channel 2 |

CLC HSD Connect Message

This message carries the information necessary for the RU to establish a HSD connection.

Message ID=00011 (0x03)

TABLE 3.3

CLC HSD Connect Message Payload

| Element | Size (Bits) | Description |
| --- | --- | --- |
| TEI | 14 | Data link Termination endpoint identifier |
| Modulation type | 2 | Modulation type |
| TDMA map | 8 | TDMA channel bitmap |
| FDMA map | 16 | FDMA channel bitmap |

CLC Extended HSD Connect Message

This message sends the extra information needed by the RU LAPW to establish a HSD call.

Message ID=00100 (0x04)

TABLE 3.4

CLC Extended HSD Connect Message Payload

| Element | Size (Bits) | Description |
| --- | --- | --- |
| Response Ack Timer (t200) | 8 | Duration in which the sender waits for an acknowledgement (in 250 ms) |
| Idle Timer (t203) | 8 | LAPW Keep-alive timer (in seconds) |
| Receiver Ack Timer (t205) | 8 | Duration in which the receiver will wait before sending an acknowledge unless told otherwise (in 250 ms) |
| LAPW Max retries (n200) | 4 | Maximum number of retries for a LAPW message |
| Window size (k) | 4 | LAPW peer-to-peer window size |
| Primary downlink | 4 | Primary downlink channel |

CLC Measurement Message

The CLC measurement message is used to request traffic channel quality information from the RU.

Message ID=00101 (0x05)

TABLE 3.5

CLC Extended HSD Connect Message Payload

| Element | Size (Bits) | Description |
| --- | --- | --- |
| Extended slot | 4 | Slot number reserved for the extended measurement response message |
| Direction | 1 | 0/1: Originating/Terminating call |
| Line ID | 2 | Calling/Called Line ID |
| Pad | 1 | Pad |
| Payload | 8 | Network payload |

CLC Delay Message

The CLC delay message is used to send the measured time delay value from the Base to the RU. The delay parameter that is contained in the CLC delay message represents the delay that has been previously measured at the Base, using the DCP signal initiated at the RU. This parameter represents a compensation that the RU must utilize.

Message ID=00110 (0x06)

TABLE 3.6

CLC Delay Message

| Element | Size (Bits) | Description |
| --- | --- | --- |
| Delay value | 16 | Measured delay compensation value |

CLC Deny Message

Message ID=00111 (0x07)

This message is used by the Base to deny a request for access to the physical medium by an RU.

TABLE 3.7

| Element | Size (Bits) | Description |
| --- | --- | --- |
| | | CLC Deny Message |
| Line ID | 2 | Line ID being denied |

CLC Poll Message
Message ID=01000 (0x08)
This message is used by the Base to poll an RU. There is no payload associated with this message.
3.3.2.7.3 Structure of Specific CLC HSN Messages
This section describes the message ID and payload fields for specific CLC HSN messages.
CLC Install Ack Message
The CLC Install Ack message is used to acknowledge a segment of an installation message received from the RU.
Message ID=01001 (0x09)

TABLE 3.1

| Element | Size (Bits) | Description |
| --- | --- | --- |
| | | CLC Install Ack Message Payload |
| Sequence Number | 8 | Acknowledgement to the received segment |

CLC TxConfig Message
The CLC TxConfig message is used to acknowledge a CAC TxConfig from the RU. There is no payload associated with this message.
Message ID=01010 (0x0a)
CLC TxMeas Message
The CLC Meas Ack message is used to acknowledge a CAC TxMeas from the RU.
Message ID=01011 (0x0b)

TABLE 3.2

| Element | Size (Bits) | Description |
| --- | --- | --- |
| | | CLC Install Ack Message Payload |
| Power Control | 8 | Power control |
| Delay comp | 8 | Delay compensation |

3.3.5 MAC Timers
Table 3.2, "MAC Timers" defines the timers required by the MAC.

TABLE 3.2

| Timer | Description | Default (ms) | Range (ms) |
| --- | --- | --- | --- |
| | MAC Timers | | |
| t_mac-pdataack | This timer represents the time that the transmitting end should wait for the reception of an acknowledgment to a pdata packet | TBD | TBD |
| t_mac-ndataack | This timer represents the time that the transmitting end should wait for the reception of an acknowledgment to an ndata packet | TBD | |

TABLE 3.2-continued

| Timer | Description | Default (ms) | Range (ms) |
| --- | --- | --- | --- |
| | MAC Timers | | |
| t_mac-CACack | This represents the maximum time that the Base MAC access entity should wait to receive an acknowledgment from the CAC channel (e.g., connect to connect Ack) | TBD | |
| t_mac-access | Used to detect errors in response to RU (CAC) initiated messages on the access key; this represents the slotted ALOHA wait period for the positive acknowledgment | TBD | 66 to 112 |
| t_mac-sup | Used to time the receipt of a UA after a supervisory message has been transmitted | TBD | |
| t_mac-AccessBackoff | This timer limits the range for the random backoff time for slotted ALOHA access; the actual time is derived randomly from a TBD algorithm | TBD | 0 to 72 |
| t_mac-idle | This represents the maximum time that the LCC shall remain idle. | t_mac-idle(base) = TBD, t_mac-idle(RU) > t_mac-idle(base) * n_mac-sup | |

3.3.6 MAC Counters
Table 3.3 defines the counters that are required for the MAC.

TABLE 3.3

| Timer | Description | Default (ms) | Range (ms) |
| --- | --- | --- | --- |
| | MAC Counters | | |
| n_mac-pdataack | This counter is used to count the number of failed pdata transmissions over the data link | 6 | |
| n_mac-ndataack | This counter is used to count the number of failed ndata transmissions over the data link | 6 | |
| n_mac-access | This counter is used to count the number of failed access attempts that an RU has made | 4 | |
| n_mac-sleep | This counter is used to count the number of failed sleep notification attempts that an RU has made | | |
| n_mac-cacack | This counter is used to count the number of CLC messages that an RU fails to acknowledge | 2 | |
| n_mac-sup | Number of supervisory messages that may be transmitted without the receipt of a UA. | | |

3.4 Elements of Layer-to-Layer Communication
This section describes the primitives that are used for layer-to-layer communication between the MAC and the DLC layer and the MAC and the physical layer.
Note that an instance of MAC access control must exist for every session of link establishment and an instance of MAC link control must exist for every data link connection. An instance routing mechanism should be implemented accordingly.

3.4.1 Communication with Data Link Control
3.4.1.1 Access Control

All information exchanged between the access control entity and the DLC flows through the AC-SAP.

3.4.1.1.1 AC-SAP and Primitives

The AC-SAP provides communication with the access control entity of the MAC to allow the RU to gain access to the PWAN. This section lists the primitives that flow across the AC-SAP.

mac_ac-conn.req

TABLE 3.1

| mac_ac-conn.req Primitive | |
|---|---|
| Element | Description |
| RU ID | This is used to identify the RU |
| Line ID | Used to identify the particular subscriber line interface circuit |
| Bearer mode | This bit is used to distinguish a traffic bearer from a non-traffic bearer (i.e., for a connection that requires only data services, data patterns may be optimized). Traffic = 1 Data = 0 |

This primitive is issued by the Base DLC to the MAC to request that a connection setup be initiated.

mac_ac-connind

TABLE 3.2

| mac_ac-conn.ind Primitive | |
|---|---|
| Element | Description |
| RU ID | This is used to identify the RU |
| Line ID | Used to identify the particular subscriber line interface circuit. |
| Bearer mode | This bit is used to distinguish a traffic bearer from a non-traffic bearer (i.e., for a connection that requires only data services, data patterns may be optimized). Traffic = 1 Data = 0 |
| Channel identifier | This is used to identify the traffic channel associated with the data link |
| Originate flag | 0 - call originated from RU 1 - call originated from Base |

This primitive is used to inform the RU DLC that a connection has been granted via the access mechanism.

Mac_ac-conn.cfm

TABLE 3.3

| mac_ac-conn.cfm Primitive | |
|---|---|
| Element | Description |
| Channel ID | This is used to identify the traffic channel associated with the data link |

This primitive is used to inform the Base DLC that a connection has been granted via the access mechanism.

mac_ac-access.req

TABLE 3.4

| mac_ac-access.req Primitive | |
|---|---|
| Element | Description |
| RU ID | This is used to identify the RU |
| Line ID | Used to identify the particular subscriber line interface circuit |
| Bearer mode | This bit is used to distinguish a traffic bearer from a non-traffic bearer (i.e., for a connection that requires only data services, data patterns may be optimized) Traffic = 1 Data = 0 |
| Network payload | This payload represents the signalling state of the subscriber line interface circuit |

This primitive is issued by the RU DLC to the MAC to request access to the PWAN.

mac_ac-accessind

TABLE 3.5

| mac_ac-access.ind Primitive | |
|---|---|
| Element | Description |
| RU ID | This is used to identify the RU |
| Line ID | Used to identify the particular subscriber line interface circuit |
| Bearer mode | This bit is used to distinguish a traffic bearer from a non-traffic bearer (i.e., for a connection that requires only data services, data patterns may be optimized) Traffic = 1 Data = 0 |
| Network payload | This payload represents the signalling state of the subscriber line interface circuit |
| Channel ID | This is used to identify the traffic channel associated with the data link |

This primitive is used to inform the Base DLC that an access has been initiated.

mac_ac-deny.ind

TABLE 3.6

| mac_ac-deny.ind Primitive | |
|---|---|
| Element | Description |
| Cause code | Provides the DLC with cause for access denial |

This primitive is used to send a notification that access to the physical layer has been denied, along with some information on the reason for denial.

mac_ac-rel.cfm

TABLE 3.7

| ma_ac-rel.cfm Primitive | |
|---|---|
| Element | Description |
| Cause code | Provides the DLC with cause for a release of the data link |

This primitive informs the DLC that the data link has failed to be established. The cause code indicates the reason for the failure.

3.4.2 Communication with PWAN Physical Layer

The physical layer provides a transport mechanism for the MAC layer between the Base and RU via four channels (LCC, CLC, CAC, and BC).

3.4.2.2 Common Access: CA-SAP

The CA-SAP is used to send access request information from the RU to the Base. During link establishment, it is used in coordination with the CL-SAP. The CA-SAP is a one directional SAP, the direction depending on whether it is at the RU or the Base. At the RU, the SAP carries information from the MAC to the physical layer. At the Base, it carries information from the physical layer to the MAC.

3.4.2.3 Common Link: CL-SAP

The CL-SAP is used to send information from the Base to the RU. During link establishment, it is used in coordination with the CA-SAP. The CL-SAP is a one directional SAP, the direction depending on whether it is at the RU or the Base. At the RU, the SAP carries information from the physical layer to the MAC. At the Base, it carries information from the MAC to the physical layer.

3.5 Definition of Peer-to-Peer Procedures

Peer-to-peer procedures, under non-troubled operation for the MAC layer are described in this section.

3.5.1 Order of Bit Transmission

This section describes the order in which a message (CAC, CLC, LCC, or BC) will be transmitted over the respective channel. This section should be used to ensure that all messages are built and stored such that this order of transmission will facilitate their use.

Figure 19:
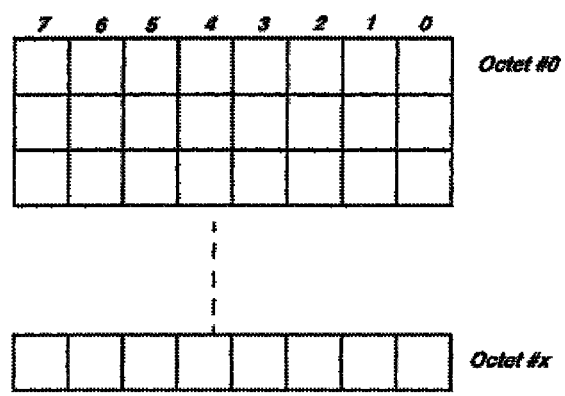
FIG. 19 is a diagram illustrating Order Bit Transmission.

Note: In FIG. 19, if the octets were those of a message stored in RAM to be transmitted over a channel, the first bit (bit 0) of Octet 0 will be transmitted first.

For the CAC, CLC, and BC, the first bit of the physical layer training pattern is the first bit to be transmitted.

It should be readily apparent and understood that the foregoing description is only illustrative of the invention and in particular provides preferred embodiments thereof. Various alternatives and modifications can be devised by those skilled in the art without departing from the true spirit and scope of the invention. Accordingly, the present invention is intended to embrace all such alternatives, modifications, and variations which fall within the scope of the appended claims.

What is claimed is:

1. A method performed by a wireless base unit, the method comprising:
    before establishing a connection oriented data link with a wireless transceiver unit, sending a first plurality of polling messages to the wireless transceiver unit requesting information, and receiving status information in response to the first plurality of polling messages from the wireless transceiver unit;
    establishing a connection oriented data link with the wireless transceiver unit based on the status information received in response to the first plurality of polling messages, the connection oriented data link comprising a session established between the wireless base unit and the wireless transceiver unit; and
    receiving data from the wireless transceiver unit over the connection oriented data link.

2. The method of claim 1, wherein the first plurality of polling messages are sent periodically.

3. The method of claim 1, further comprising before the connection oriented data link is established with the wireless transceiver unit:
    receiving a problem message from the wireless transceiver unit; and
    in response to the problem message, sending the plurality of polling messages to a wireless transceiver unit.

4. The method of claim 3, wherein the problem message indicates the wireless transceiver unit has experienced a power failure and is being powered by a backup battery.

5. The method of claim 1, wherein the first polling messages are sent to the wireless transceiver unit over a Common Link Channel and the status information sent in response to the first plurality of polling messages is received from the wireless transceiver unit over a Common Access Channel.

6. The method of claim 1, further comprising:
    in response to the first plurality of polling messages, receiving configuration information, outage information, or call record information from the wireless transceiver unit.

7. The method of claim 1, further comprising:
    in response to the first plurality of polling messages, receiving operating condition information, operating mode information, or previous usage information from the wireless transceiver unit.

8. The method of claim 1, further comprising:
    in response to the first plurality of polling messages, receiving reception and transmission parameters for the wireless transceiver unit from the wireless transceiver unit.

9. The method of claim 1, further comprising:
    in response to the first plurality of polling messages, receiving identifications of telephone calls made or received over a period of time from the wireless transceiver unit.

10. The method of claim 1, further comprising:
    in response to the first plurality of polling messages, receiving call record information related to a plurality of calls placed or received by the wireless transceiver unit, the call record information comprising timestamps of the calls, durations of the calls, or a number of calls in the plurality of calls from the wireless transceiver unit.

11. The method of claim 1, further comprising:
    sending a channel quality request message to the wireless transceiver unit; and
    receiving a channel quality response message from the wireless transceiver unit comprising a received signal strength value for a plurality of channels.

12. The method of claim 1, further comprising:
    before the connection oriented data link is established with the wireless transceiver unit, receiving a request from the wireless transceiver unit to initiate a call on an unsolicited Common Access Channel, the request including a sleep status of the wireless transceiver unit.

13. The method of claim 1, further comprising before the connection oriented data link is established with the wireless transceiver unit:
    receiving an access request from the wireless transceiver unit to initiate a call on an unsolicited Common Access Channel; and
    in response to the access request, assigning a scheduled Common Access Channel to the wireless transceiver unit to thereby establish substantially collision-free transmission on the scheduled Common Access Channel by the wireless transceiver unit.

14. The method of claim 13, wherein the access request requests the establishment of a High Speed Data link.

15. The method of claim 13, wherein the access request requests the establishment of a voice traffic channel.

16. The method of claim 1, further comprising before the connection oriented data link is established with the wireless transceiver unit:
    receiving an access request from the wireless transceiver unit to initiate a call on an unsolicited Common Access Channel; and
    in response to the access request, sending a connect message to the wireless transceiver comprising physical layer parameters required for establishing the connection oriented data link with the wireless transceiver unit.

17. The method of claim 16, wherein the access request requests the establishment of a High Speed Data link and the physical layer parameters comprise parameters required for establishing the High Speed Data link with the wireless transceiver unit.

18. The method of claim 1, further comprising:
sending a second plurality of polling messages to the wireless transceiver unit requesting information to facilitate subscriber services;
receiving information in response to the second plurality of polling messages from the wireless transceiver unit; and
maintaining event logs based at least in part on the information received in response to the second plurality of polling messages.

19. A method performed by a wireless base unit, the method comprising:
before establishing connection oriented data links with a plurality of wireless transceiver units, broadcasting a first plurality of polling messages to the wireless transceiver units requesting information, and in response to the first plurality of polling messages, receiving status information from at least a portion of the plurality of wireless transceiver units;
establishing a separate connection oriented data link with each of the wireless transceiver units in the portion of the plurality of wireless transceiver units based on the status information received from the wireless transceiver unit in response to the first plurality of polling messages, the connection oriented data link established for each of the wireless transceiver units in the portion of the plurality of wireless transceiver units comprising a session established between the wireless base unit and the wireless transceiver unit; and
receiving data from each of the wireless transceiver units in the portion of the plurality of wireless transceiver units over the connection oriented data link established therewith.

20. The method of claim 19, wherein the first plurality of polling messages are sent to the wireless transceiver unit over a Broadcast Channel and the information sent in response to the first plurality of polling messages is received from each of the wireless transceiver units in the portion of the plurality of wireless transceiver units over a Common Access Channel.

21. The method of claim 19, further comprising:
broadcasting a second plurality of polling messages to the wireless transceiver units requesting information to facilitate subscriber services;
receiving information in response to the second plurality of polling messages from the wireless transceiver units; and
maintaining event logs based at least in part on the information received in response to the second plurality of polling messages.

22. The method of claim 19, further comprising:
in response to the first plurality of polling messages, receiving configuration information, outage information, or call record information from the portion of the plurality of wireless transceiver units.

23. The method of claim 19, further comprising before the separate connection oriented data links are established with each of the wireless transceiver units in the portion of the plurality of wireless transceiver units:
receiving an access request from each of the wireless transceiver units in the portion of the plurality of wireless transceiver units to initiate a call on an unsolicited Common Access Channel; and
in response to each of the access requests, sending a connect message to the wireless transceiver that sent the access request, the connect message comprising physical layer parameters required for establishing the connection oriented data link with the wireless transceiver unit.

24. The method of claim 23, wherein for each access request requesting the establishment of a High Speed Data link, the physical layer parameters comprise parameters required for establishing the High Speed Data link with the wireless transceiver unit that sent the access request.

25. The method of claim 23, wherein the access requests comprise a request for a voice channel.

\* \* \* \* \*